United States Patent
Subramanian et al.

(10) Patent No.: US 11,715,278 B2
(45) Date of Patent: Aug. 1, 2023

(54) REAL TIME TRACKING OF SHELF ACTIVITY SUPPORTING DYNAMIC SHELF SIZE, CONFIGURATION AND ITEM CONTAINMENT

(71) Applicant: Sensormatic Electronics, LLC, Boca Raton, FL (US)

(72) Inventors: Gopi Subramanian, Boca Raton, FL (US); Joseph Celi, Boca Raton, FL (US); Michael C. Stewart, Deerfield Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 234 days.

(21) Appl. No.: 17/019,010

(22) Filed: Sep. 11, 2020

(65) Prior Publication Data
US 2022/0083803 A1    Mar. 17, 2022

(51) Int. Cl.
*G06V 10/25* (2022.01)
*G06N 20/00* (2019.01)
*G06V 20/40* (2022.01)
*G06V 10/75* (2022.01)
*G06F 18/214* (2023.01)

(52) U.S. Cl.
CPC ............ *G06V 10/25* (2022.01); *G06F 18/214* (2023.01); *G06N 20/00* (2019.01); *G06V 10/758* (2022.01); *G06V 20/41* (2022.01)

(58) Field of Classification Search
CPC ...... G06V 10/25; G06V 10/758; G06V 20/41; G06V 20/52; G06V 20/586; G06V 20/10; G06K 9/6256; G06N 20/00

USPC ........................................................ 382/199
See application file for complete search history.

(56) References Cited

U.S. PATENT DOCUMENTS

| | | | |
|---|---|---|---|
| 9,996,818 B1 * | 6/2018 | Ren ........................ | G06V 20/52 |
| 2015/0262116 A1 * | 9/2015 | Katircioglu ............ | G06V 20/52 |
| | | | 705/28 |
| 2017/0323376 A1 | 11/2017 | Glaser et al. | |
| 2018/0121721 A1 | 5/2018 | Garcia et al. | |
| 2021/0125409 A1 * | 4/2021 | Mirza ................... | G06T 19/006 |

OTHER PUBLICATIONS

International Search Report and Written opinion for International Patent Application No. PCT/US2021/071378, dated Jan. 4, 2022 (103 pages).
Saran et al., "Robust visual analysis for planogram compliance problem," 2015 14th IAPR International Conference on Machine Vision Applications (MVA), 2015, pp. 576-579.

\* cited by examiner

*Primary Examiner* — Neil R Mclean
(74) *Attorney, Agent, or Firm* — ArentFox Schiff LLP

(57) ABSTRACT

A system may be configured to accurately track shelf activity in real-time with support for dynamic shelf size, configuration, and item containment. In some aspects, the system may parse regions of a video frame to determine a region of interest representation corresponding to a physical location (e.g., a shelf compartment), determine an enhanced region of interest representation based at least in part on the region of interest representation and an image enhancement pipeline, determine edge information of one or more objects based on the enhanced region of interest representation, compare a reference representation of the physical location to the edge information, and determine the amount of available space for the physical location based on the comparing.

20 Claims, 9 Drawing Sheets

REAL TIME TRACKING OF SHELF ACTIVITY SUPPORTING DYNAMIC SHELF SIZE, CONFIGURATION AND ITEM CONTAINMENT

CROSS REFERENCE TO RELATED APPLICATIONS

This application is related to co-pending U.S. patent application Ser. No. 17/018,992, by Subramanian et al., entitled "Method and System to Provide Real Time Interior Analytics Using Machine Learning and Computer Vision," filed on Sep. 11, 2020, which is hereby incorporated by reference in its entirety.

BACKGROUND

The present disclosure relates generally to tracking shelf activity, and more particularly, to systems and methods for employing computer vision to implement real-time tracking of shelf activity with support for dynamic shelf size, configuration, and item containment.

Some shelf-tracking systems employ supervised machine learning (ML) systems to provide state information for a shelf (i.e., an available capacity of the shelf, a number of items stored in the shelf, etc.). In supervised learning contexts, e.g. deep learning systems, training data is employed to build a ML model. The training data is gathered from activity in a real world environment, and includes a dataset of training examples with associated labels. For instance, when training a ML model to track item activity at a shelf, the training data should include a voluminous amount of image data capturing the shelf filled at different capacities with the items that will be stored in the shelf. However, the applicability of the ML model is limited to the attributes and contents of the shelf (e.g., shelf size, shelf configurations, and the items captured in the training data) captured in the training data. Further, each time a system operator changes the attributes or contents of a shelf, the system operator must repeat the cumbersome supervised learning process or risk using an inaccurate ML model. Consequently, many shelf-tracking systems are unable to quickly and efficiently meet the needs of retail operations, which often change the attributes or contents of a shelf to maximize the monetary value of the shelf.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, methods, and apparatuses for real-time tracking of shelf activity with support for dynamic shelf size, configuration, and item containment.

In an aspect, a method for real-time tracking of shelf activity comprises parsing regions of a video frame to determine a region of interest representation corresponding to the physical location, determining an enhanced region of interest representation based at least in part on the region of interest representation and an image enhancement pipeline, determining, based on the enhanced region of interest representation, edge information of one or more objects, comparing a reference representation of the physical location to the edge information, and determining, based on the comparing, the amount of available space for the physical location.

In some implementations, the method may further comprise determining that the region of interest representation is not of a rectangular shape; and applying one or more transformations to the region of interest representation. In addition, in some implementations, the method may further comprise determining that the physical location is obstructed in the region of interest representation, parsing a second video frame to determine a second region of interest representation, determining a fragment from the second region of interest representation, the fragment including an unobstructed portion of the physical location, generating a composite representation based on the fragment and the first region of interest representation, and determining that the physical location is unobstructed in the composite representation. Further, determining the enhanced region of interest may comprise applying the image enhancement pipeline to the composite representation.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
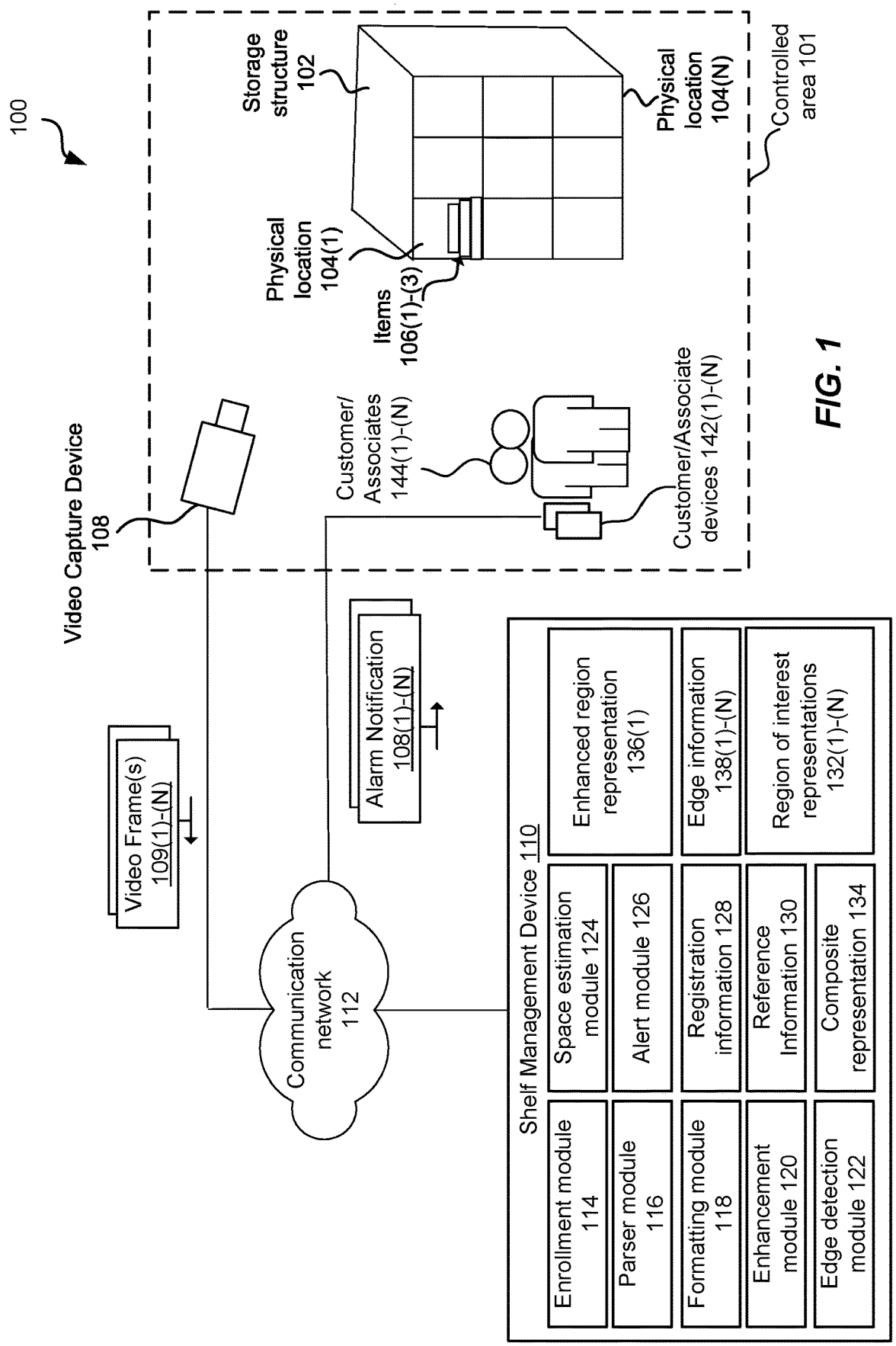
FIG. 1 is a diagram of a system for implementing real-time tracking of shelf activity with support for dynamic shelf size, configuration, and item containment, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide real-time tracking of shelf activity with support for dynamic shelf size, configuration, and item containment. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution may include efficient enrollment of shelves in a shelf-tracking system, and accurate real-time tracking of shelf activity with support for dynamic shelf size, configuration, and item containment. As used herein, in some aspects, "real-time" may refer to receiving a live feed of shelf activity at a shelf, and determining the available space at the shelf upon receipt of the live feed. For example, this present disclosure describes systems and methods that provide accurate real-time tracking of activity at a shelf even when the attributes or contents of the shelf change or the video capture device produces warped image data corresponding to the shelf.

Implementations of the present disclosure may be useful for system designers and retail operators endeavoring to implement a system for tracking a shelf in real-time without sacrificing the ability to modify the size, configuration, or item containment of the shelf to maximize the value of the shelf. For example, operators of conventional shelf-tracking systems have had to rely on shelf-tracking systems that required burdensome reconfiguration and/or ML model re-training in response to changes to an attribute of a shelf. The present solution provides improved accuracy to shelf tracking and permits frictionless modifications to at least the size, configuration, and item containment of the shelf.

Referring to FIG. 1, in one non-limiting aspect, a system 100 is configured to implement real-time tracking of shelf activity with support for dynamic shelf size, configuration, and item containment within a controlled area 101. For example, as described in detail herein, the system 100 is configured to determine enrollment information for a shelf, capture a video frame of the shelf, and employ computer vision techniques and the enrollment information to monitor activity at the shelf in real-time. Further, an operator of the controlled area 101 may modify the shelf size, configuration, and item containment of the shelf without having to perform burdensome re-training of a ML model.

As illustrated in FIG. 1, the system 100 may include a storage structure 102 including one or more physical locations 104(1)-(N) for storing items 106(1)-(N), a video capture device 108 for capturing video frames 109(1)-(N) of the storage structure 102, and shelf management device 110 for determining the available space of the physical locations 104(1)-(N). Some examples of a storage structure 102 include shelves, tables, display cases, book cases, showcases, etc. Further, in some aspects, a physical location may refer to a compartment, area, and/or portion of a storage structure (e.g., a shelf of a bookcase). In addition, the storage structure 102 and the video capture device 108 may be located in the controlled area 101. Further, customers or employees within the controlled area 101 may remove and place items within the physical locations 104(1)-(N). In response, the shelf management device 110 may instantaneously or periodically determine the amount of free space within the physical locations 104(1)-(N) and/or the number of items 106(1)-(N) within each physical location 104(1)-(N). Although FIG. 1 illustrates one storage structure 102 and one video capture device 108, in some other implementations the system 100 may include any number of storage structures and video capture devices.

In some aspects, the video capture device 108 may communicate with the shelf management device 110 via a communication network 112. In some implementations, the communication network 112 may include one or more of a wired and/or wireless private network, personal area network, local area network, wide area network, or the Internet.

As illustrated in FIG. 1, the shelf management device 110 may include an enrollment module 114, a parser module 116, a formatting module 118, an enhancement module 120, an edge detection module 122, a space estimation module 124, and an alert module 126. The enrollment module 114 may be configured to perform an enrollment process for determining registration information 128 for the physical locations 104(1)-(N). In some aspects, the enrollment module 114 may present an enrollment graphical user interface (GUI) that collects registration information 128 for each of the individual physical locations 104(1)-(N). Additionally, or alternatively, the enrollment module 114 may employ machine learning techniques or pattern recognition techniques to automatically determine at least portions of the registration information 128.

The registration information 128 may include an identifier (e.g., name, description, etc.) of the physical location 104, region of interest information identifying boundaries of the physical location 104, dimension information indicating the dimensions of the physical location 104 in at least one of the two-dimensional or three-dimensional space, depth information indicating whether there are multiple rows of items, location information (e.g., identifier of the controlled area 101, region within the controlled area 101, etc.) identifying a location of a physical location 104, one or more attributes of the physical location 104 (e.g., type of customers associated with the physical location 104), a name or type of item currently stored in the physical location 104, an orientation of the items within the physical location 104, the number of items currently within the physical location 104, a useable capacity defining the amount of the total capacity of the physical location 104 to employ for storage of the items, an amount of the items that can be stored within the useable capacity, and one or more attributes of the item (e.g., color, size, style, price, applicable discounts, upsell relationship information, cross-sell relationship information, etc.). In some aspects, the enrollment GUI may present a marking tool configured to display the physical location 104 within the enrollment GUI and receive indication of the boundaries of a physical location 104 via user input (e.g., mouse input, touch input, keyboard input, etc.) during a one-time enrollment event. As described in detail herein, the enrollment event does not have to be repeated when the type of items stored in physical location is changed. Further, a user can quickly update the boundaries of the physical location 104 when the size or configuration of the physical location 104 is changed, which is far less burdensome than retraining a ML model.

As illustrated in FIG. 1, the shelf management device 110 may include reference information 130 associated with the physical locations 104(1)-(N). For example, upon receipt of the registration information 128 for a physical location 104, the enrollment module 114 may generate reference information 130 corresponding to the physical location 104. In some aspects, the reference information 130 may define the dimensions of the physical location 104 according to a predefined format. Further, the enrollment module 114 may employ the parser module 116, the formatting module 118, the enhancement module 120, and/or the edge detection module 122 to determine the reference information 130.

The parser module 116 may be configured to receive the video frames 109(1)-(N) of the video feed from the video capture device 108, and parse the video frames 109(1)-(N) into a plurality of region of interest representations 132(1)-(N). Further, each region of interest representation 132 may correspond to a physical location 104. For example, the region of interest representation 132(1) may correspond to the physical location 104(1), the region of interest representation 132(N) may correspond to the physical location 104(N), and so forth. Additionally, or alternatively, each region of interest representation 132 may correspond to a plurality of physical locations 104 or an entire storage structure 102.

The formatting module 118 may be configured to format the region of interest representations 132(1)-(N) to be used to determine the amount of free space within the physical locations 104(1)-(N) and/or the number of items 106(1)-(N) within each physical location 104(1)-(N). In some aspects, the formatting module 118 may be configured to determine whether the region of interest representation 132 is of a predefined shape (e.g., a rectangular shape) and format the region of interest representation 132 to the predefined shape. For example, if the region of interest representation 132(1) is not of a rectangular shape, the formatting module 118 may perform at least one of a perspective transformation, de-warping transformation, or rotation transformation to update the region of interest representation 132(1) so that the region of interest representation 132(1) is of the predefined shape.

Further, the formatting module 118 may be configured to determine whether a physical location 104 is obstructed in the region of interest representation 132. For example, a customer or associate may be positioned in between the video capture device 108 and the physical location 104(1), and thus obstruct the view of the physical location 104(1) within the video frame. In some aspects, if the formatting module 118 may be configured to determine whether the physical location 104(1) is obstructed in the region of interest representation 132(1), the formatting module 118 may restart the process by instructing the parser module 116 to generate an updated region of interest representation 132(1).

In some other aspects, if the formatting module 118 determines that the physical location 104(1) is obstructed in the region of interest representation 132(1), the formatting module 118 may collect a plurality of the region of interest representations 132 corresponding to the physical location 104(1), determine unobstructed portions (i.e., fragments) of the physical location 104(1) within the plurality of region of interest representations, and generate a composite representation 134 with an unobstructed view of the physical location 104(1) based on combining the fragments.

The enhancement module 120 may be configured to perform one or more enhancement processes on a region of interest representation 132 or a composite representation 134 to determine enhanced representations 136(1)-(N). For example, if the formatting module 118 determines that the region of interest representation 132 is of a predefined shape or formats the region of interest representation 132 to the predefined shape, the enhancement module 120 may perform one or more enhancement methods on the region of interest representation 132(1) to generate the enhanced region representation 136(1). Some examples of enhancement methods include light correction, shadow effect filtering, and histogram equalization. In particular, the enhancement module 120 may apply a gamma intensity correction (GIC) to the region of interest representations 132(1)-(N) to correct lighting variations within the region of interest representations 132(1)-(N), a difference of Gaussian filtering algorithm to the region of interest representations 132(1)-(N) to reduce or eliminate shadowing effects within the region of interest representations 132(1)-(N), and/or histogram equalization to the region of interest representations 132(1)-(N) to improve the image contrast within the region of interest representations 132(1)-(N).

The edge detection module 122 may be configured to detect edges of the items 106(1)-(N) as represented within enhanced representations 136(1)-(N). For example, the edge detection module 122 may determine edge information 138(1) defining the edges around the items 106(1)-(4) as represented within the enhanced representation 136(1). In some aspects, the edge detection module 122 may employ machine learning techniques or pattern recognition techniques to identify the edges of the items 106(1)-(4) as represented within the enhanced representation 136(1). Additionally, or alternatively, the edge detection module 122 may be configured to generate the edge information 138(1)-(N) based on detecting the edges of the items 106(1)-(N) as represented within the composite representations 134. Further, in some aspects, the physical location 104(1) may have multiple rows and/or columns of items 106. When the physical location has multiple rows or columns, the edge detection module 122 may determine the edge information for each row or column within the physical location 104(1) and combine the edge information for each row or column to determine the edge information 138(1). Further, the edge detection module 122 may configured to determine edge information in three dimensions when determining the edge information 138 for physical locations 104 having multiple rows of items 106.

The space estimation module 124 may be configured to determine the available space in the physical locations 104(1)-(N) based on the edge information 138(1)-(N) and the reference information 130. For example, the space estimation module 124 may determine the percentage of space available in the physical location 104(1) based upon determining a difference between the reference information 130 of the physical location 104(1) and the edge information 138(1) corresponding to the physical location 104(1). Further, the space estimation module 124 may be configured to determine the number of items 106 currently within the physical location 104(1) based upon the available space within the physical location 104(1). In some aspects, the space estimation module 124 may determine the number of items 106 in the physical location 104(1) based on determining how many items would take up the amount of space within the physical location 104(1) deemed unavailable based on the reference information 130 and/or the edge information 138(1).

For example, the space estimation module 124 may compare the number of items 106 stored in the physical location 104(1) during generation of the reference information 130 and the amount of available space within the physical location 104(1) during generation of the reference information 130 with the current amount of available space to determine the number of items 106 currently within the physical location 104(1). Further, the space estimation module 124 may be configured to display the amount of available space and/or the number of items 106 currently stored in the physical locations 104(1)-(N) within a GUI or send a message including the amount of available space or the number of items 106 currently stored in the physical locations 104(1)-(N). In some aspects, the space estimation module 124 may present an overlay over a graphical representation of the storage structure 102 as captured by the video capture device 108. For example, the space estimation module 124 may cause the available space or unavailable space of each physical location 104 to be displayed over the physical location 104 within a GUI.

The alert module 126 may be configured to provide alert notifications 140(1)-(N) indicating that a physical location 104 may need to be restocked. For example, the alert module 126 may indicate that the amount of items 106 remaining within the physical location 104(1) as determined by the space estimation module 124 is less than a threshold amount and/or percentage of the available space. In some aspects, the threshold amount may be defined within the registration information 128. Further, the alert module 126 may be configured to provide alert messages 140(1)-(N) indicating anomalous activity (e.g., a sweep) potentially correlating to unauthorized activity (e.g., theft) at the storage structure 102. For example, the alert module 126 may indicate that the amount of items 106 removed from the physical location 104(1) as determined by the space estimation module 124 over a period of time is greater than a threshold amount. In some aspects, the threshold amount and/or period of time may be defined within the registration information 128. In some other aspects, the shelf management device 110 may employ machine learning techniques or pattern recognition techniques to determine a threshold value and corresponding period of time that may indicate anomalous activity. Additionally, the alert module 126 may provide the alert notifications 140(1)-(N) indicating that a physical location 104 may need to be restocked based upon an upsell or cross-sell relationship between the physical location and another physical location that the alert module 126 identifies as needing to be restocked.

Further, the alert module 126 may be configured to send the alert notifications 140(1)-(N) to a customer/associate device 142 associated with one or more customers or associates 144 within the controlled area 101.

Figure 2A:
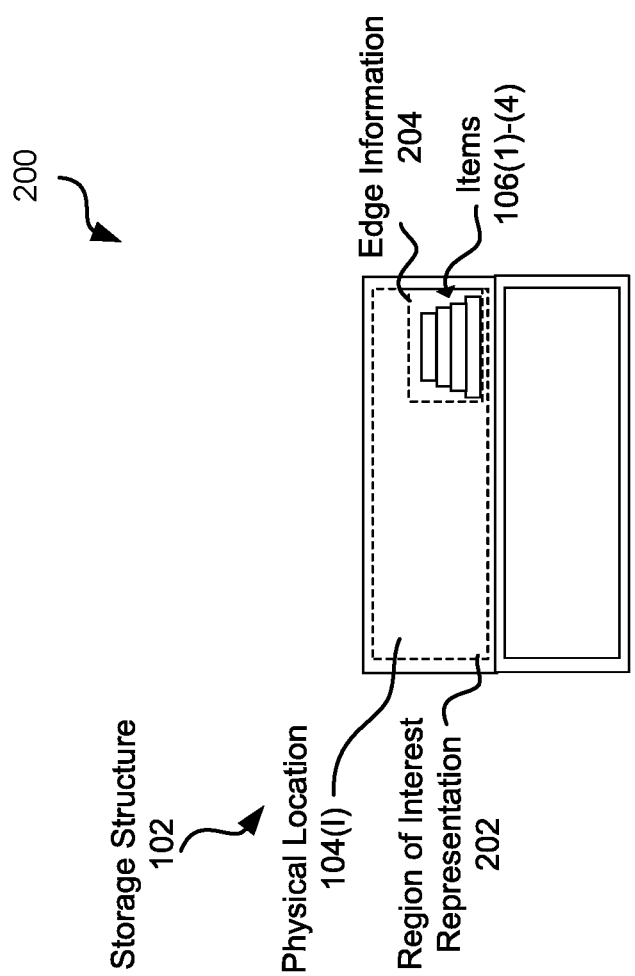
FIG. 2A illustrates a graphical representation of example output of a parsing operation and an edge detection operation, according to some implementations.

FIG. 2A illustrates a graphical representation 200 of example output of a parsing operation and an edge detection operation, according to some implementations. As described in detail herein, the parser module 116 may determine a region of interest representation 202 corresponding to the physical location 104(1). Further, the edge detection module 122 may be configured to determine the edge information 204 corresponding to the items 106(1)-(4) currently located within the physical location 104(1). As described herein, the edge information 204 may be used to determine the available space within the physical location 104(1) or the number of items 106(1)-(4) within the physical location 104(1).

Figure 2B:
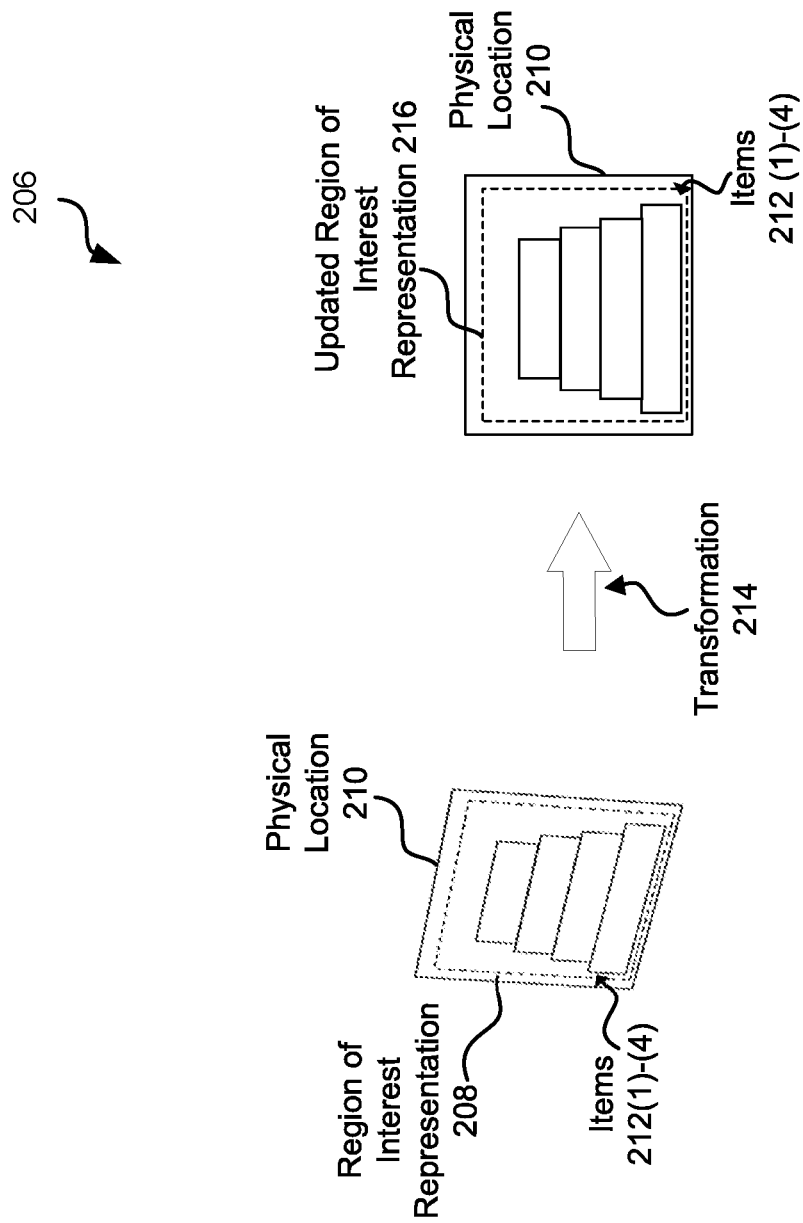
FIG. 2B illustrates a graphical representation of example output of a parsing operation and formatting operation, according to some implementations.

FIG. 2B illustrates a graphical representation 206 of example output of a parsing operation and formatting operation, according to some implementations. As described in detail herein, the parser module 116 may be configured to determine the region of interest representation 208 corresponding to the physical location 210 containing the items 212(1)-(4). Further, the formatting module 118 may be configured to determine whether the region of interest representation 208 is of a predefined shape (e.g., a rectangular shape). For example, the formatting module 118 may determine that the region of interest representation 208 is not of a rectangular shape. In some cases, the formatting module 118 may not be of a rectangular shape because of an angle of the video capture device 108 relative to the physical location 210. Further, the formatting module 118 may perform a transformation 214 (e.g., at least one of a perspective transformation, de-warping transformation, or rotation transformation) to generate the updated region of interest representation 216 that is of the predefined shape. As described herein, the shelf management device 110 subsequently determine the available space within the physical location 210 and/or the number of items 212(1)-(4) within the physical location 210 using the updated region of interest representation 216. Consequently, implementing the present solution does not require reinstallation or repositioning of existing camera systems with respect to a storage structure that a system operator intends to monitor.

Figure 2C:
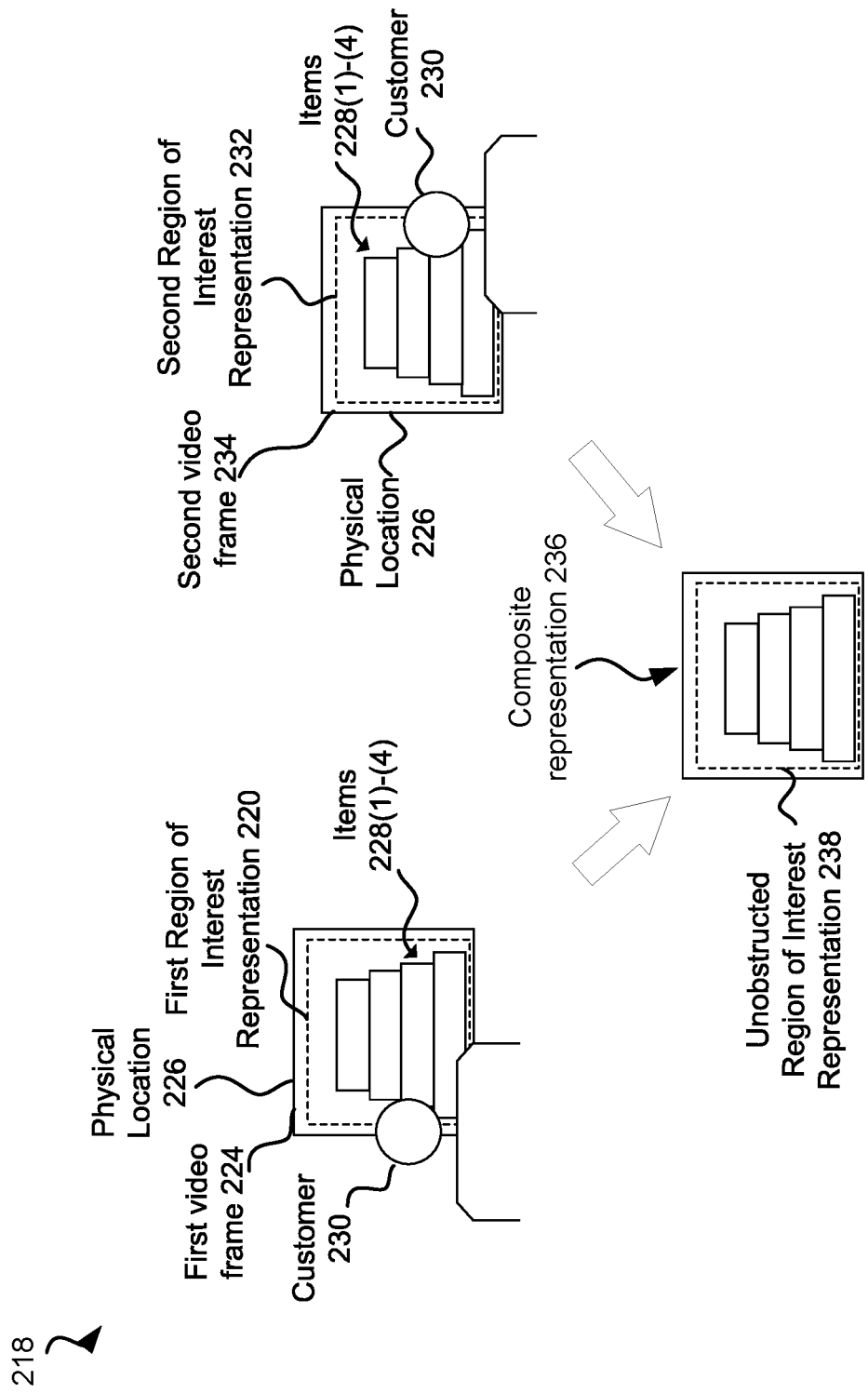
FIG. 2C illustrates a graphical representation of example output of a parsing operation and composition operation, according to some implementations.

FIG. 2C illustrates a graphical representation 218 of example output of a parsing operation and composition operation, according to some implementations. As described in detail herein, the parser module 116 may determine a first region of interest representation 220 of a first video frame 224 corresponding to the physical location 226 containing the items 228(1)-(4). Further, the formatting module 118 may be configured to determine whether the region of interest representation 220 is obstructed. For example, the formatting module 118 may determine that the first region of interest representation 220 is obstructed by the customer 230. In response, the parser module 116 may determine a second region of interest representation 232 of a second video frame 234 corresponding to the physical location 226 containing the items 228(1)-(4).

Further, the formatting module 118 may collect the unobstructed portion of the first region of interest representation 220 and the unobstructed portion of the second region of interest representation 232, and generate a composite representation 236 with an unobstructed region of interest representation 238 displaying the physical location 226 based on the unobstructed portion of the first region of interest representation 220 and the unobstructed portion of the second region of interest representation 232. Consequently the present solution may track activity at a storage structure using computer vision even if the view of the storage structure is obstructed within the video feed. Alternatively, in some aspects, the formatting module 118 may instruct the shelf management device 110 to postpone for a predetermined period of time determining the available space of a storage structure until an obstructed view of the storage structure is obtained in the video feed.

Figure 3:
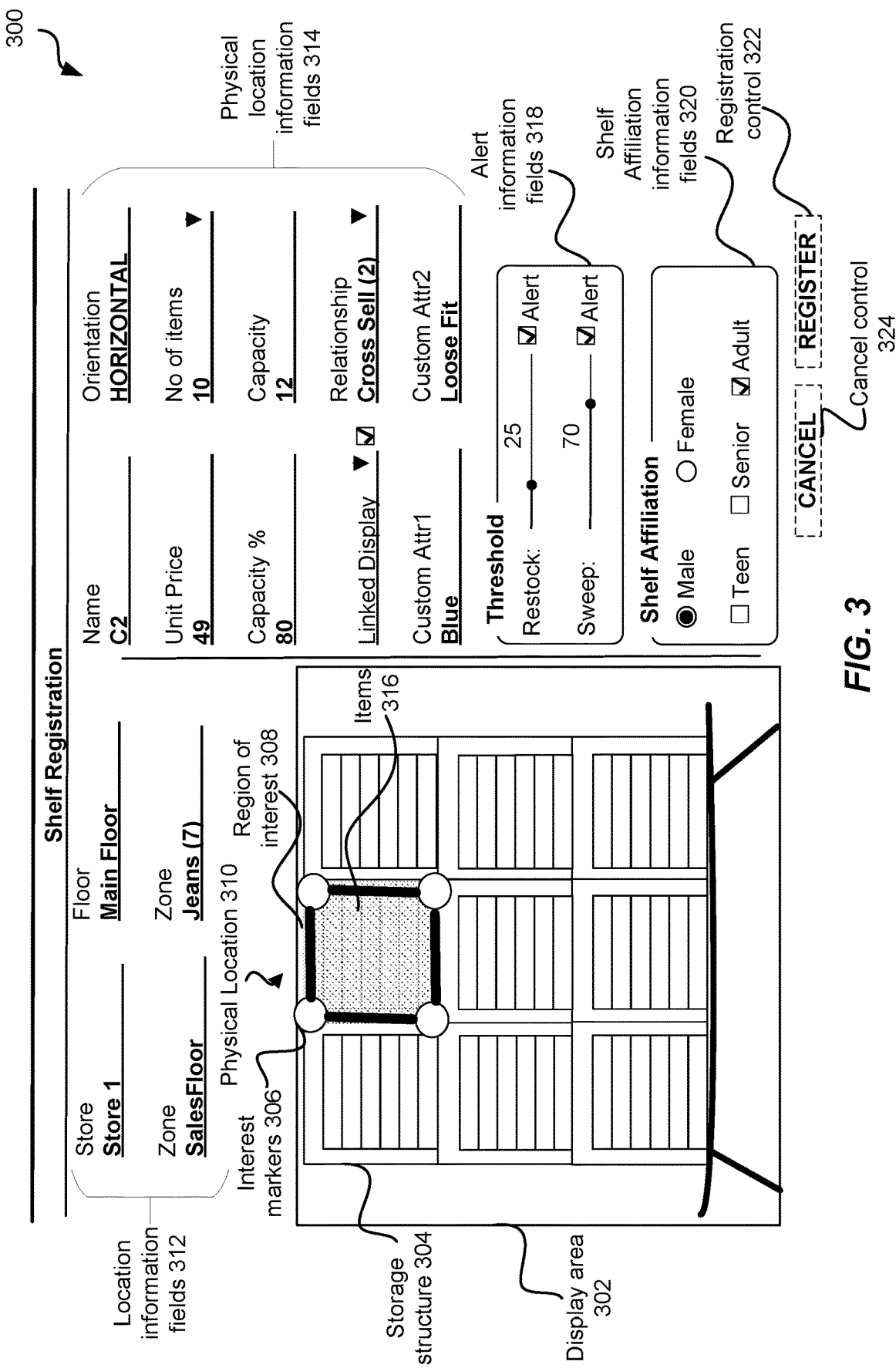
FIG. 3 illustrates an example enrollment graphical user interface (GUI) generated by an enrollment module, according to some implementations.

FIG. 3 illustrates an example enrollment GUI 300 generated at least in part by the enrollment module 114. The GUI 300 includes a display area 302 that displays video frames captured by the video capture device 108 positioned to record activity at a storage structure 304. In addition, the display area 302 may be configured to display region of interest markers 306 that a user may employ to define a region of interest 308 corresponding to a physical location 310 of the storage structure 304 that the shelf management device 110 may monitor in real-time or non-real-time (e.g., batch processing). For example, the user may employ one or more input methods to position the region of interest markers 306 at an outer boundary of the physical location 310 as represented within the display area 302.

In addition, the GUI 300 may include one or more location information fields 312. Further, a user may input location information describing one or more location identifiers of the physical location 310 within the storage structure 304 into the location information fields 312. As illustrated in FIG. 3, the location information fields 312 may include input fields for providing identifiers of the store, floor, zone, or storage structure 304 corresponding to the physical location 310.

In addition, the GUI 300 may include one or more physical location information fields 314. Further, a user may input attribute information corresponding to the physical location 310 or the items 316 within the physical location 310 into the physical location information fields 314. As illustrated in FIG. 3, the physical location information fields 314 may include one or more input fields for providing an identifier of the physical location 310, a unit price of the items 316 within the physical location 310, the orientation of the items 316 within the physical location 310, the number of items 316 within the physical location 310, the maximum number of items 316 that will be stored in the physical location 310, and the percentage of the capacity of the physical location 310 that will be used for storage of the items 316, a size of the items 316, a style of the items 316, a color of the items 316, one or more relationships between the physical location 310 or the items 316 and other items or physical locations, and/or one or more cross-sell or upsell relationships.

In addition, the GUI 300 may include one or more alert information fields 318. Further, a user may input alert information corresponding to the items 316 within the physical location 310 into the physical location information fields 314. As illustrated in FIG. 3, the alert information fields 318 may include input fields for providing a threshold for restocking the items 316 within the physical location, and/or a threshold for detecting anomalous activity (e.g., a sweep) with respect to removal of the items 316 from the physical location 310.

In addition, the GUI 300 may include one or more shelf affiliation information fields 320. Further, a user may input shelf affiliation information corresponding to the physical location 310 into the shelf affiliation information fields 320. As illustrated in FIG. 3, the shelf affiliation information fields 320 may include input fields for indicating a gender associated with the physical location 310, an age group associated with the physical location 310, and/or any other demographic information associated with the physical location 310.

In addition, the GUI 300 may include a registration control 322 (e.g., a button) for submitting the data provided by the user via the region of interest markers 306, location information fields 312, physical location information fields 314, alert information fields 318, shelf affiliation information fields 320. Upon submission of the data, the enrollment module 114 may store the data as the registration information 128. Additionally, the user may proceed to repeat the registration process for another physical location. Further, as illustrated in FIG. 3, the GUI 300 may include a cancel control 324 for clearing data provided by the user within any of the input fields.

Figure 4:
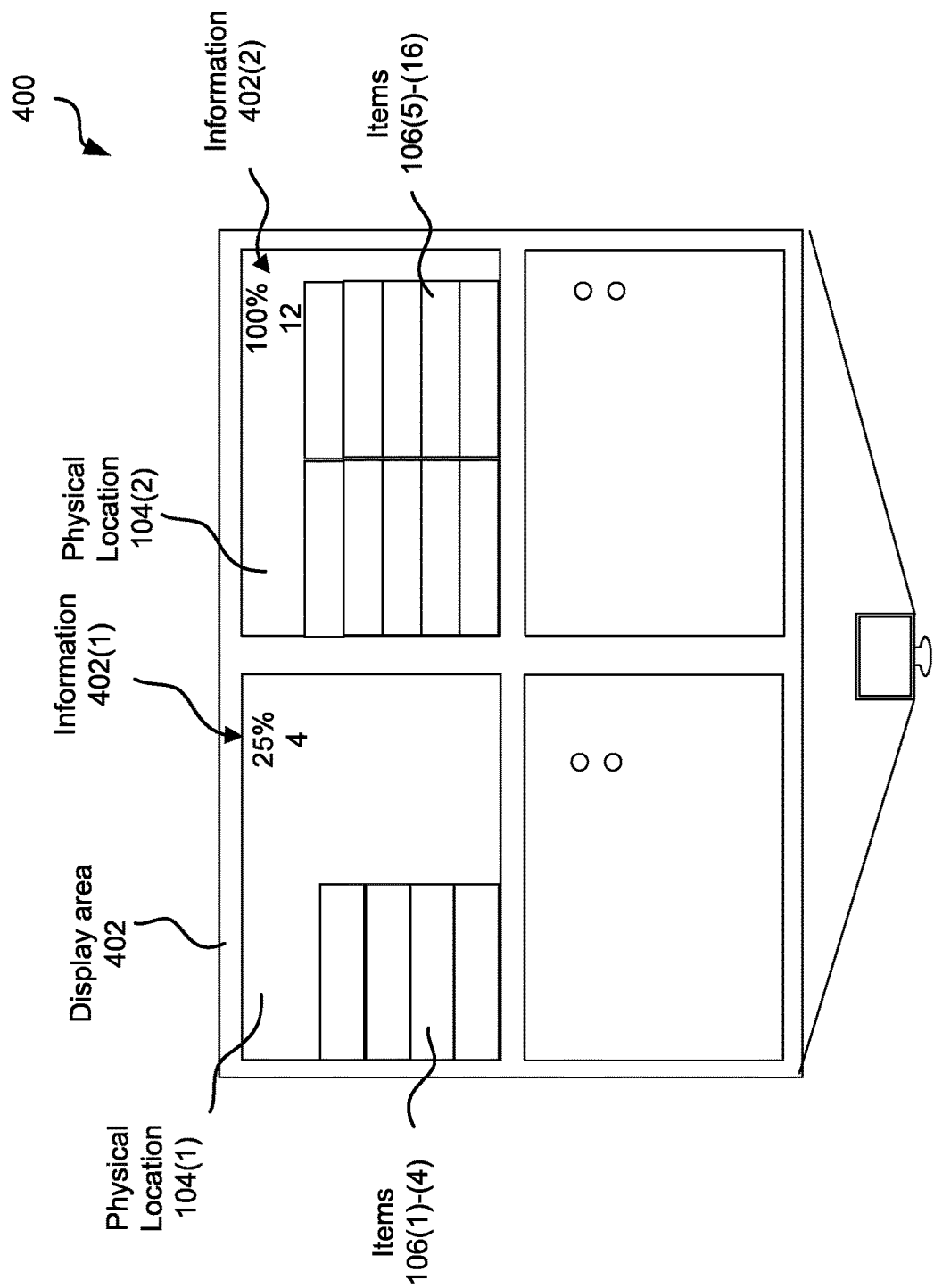
FIG. 4 illustrates a shelf information GUI generated at least in part by the space estimation module, according to some implementations.

FIG. 4 illustrates a shelf information GUI 400 generated at least in part by the space estimation module 124. As illustrated in FIG. 4, the shelf information GUI 400 may display video frames captured by the video capture device 108 within a display area 402. Further, the physical locations 104(1)-(N) within the display area 402 may be displayed with corresponding space estimation information 406(1)-(N) as determined by the space estimation module 124 in view of the items 106(1)-(16).

Figure 5:
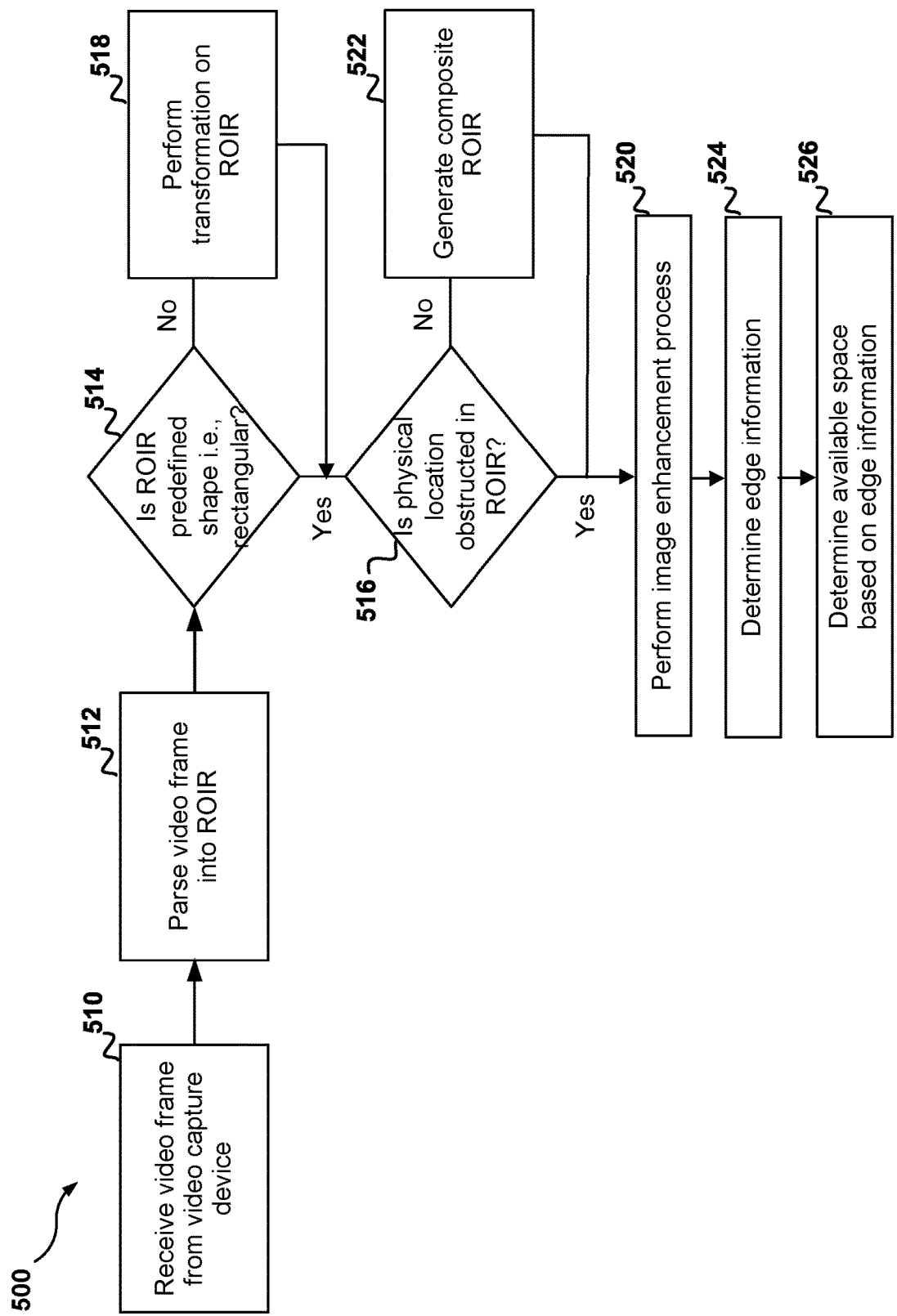
FIG. 5 is a flow diagram of an example of a method of real-time tracking of shelf activity with support for dynamic shelf size, configuration, and item containment, according to some implementations.

FIG. 5 is a flowchart of a method 500 of implementing real-time tracking of shelf activity with support for dynamic shelf size, configuration, and item containment. The method 500 may be performed by the shelf management device 110.

At block 510, the video capture device 108 may capture a video frame of the storage structure 102, and provide the video frame to the shelf management device 110. At block 512, the parser module 116 may parse the video frame to determine the region of interest representation 132(1). At block 514, the formatting module 118 may determine whether the region of interest representation 132(1) is of a rectangular shape. If the region of interest of representation (ROIR) 132(1) is of a rectangular shape, the shelf management device 110 may proceed to block 516. If the region of interest of representation 132(1) is not of a rectangular shape, the shelf management device 110 may proceed to block 518. At block 518, the formatting module 118 may perform at least one of a perspective transformation, de-warping transformation, or rotation transformation to update the region of interest representation 132(1) so that the region of interest representation 132(1) is of a rectangular shape, and proceed to block 516.

At block 516, the formatting module 118 may determine whether the physical location 104(1) is obstructed in the region of interest representation 132(1). If the formatting module 118 determines that the physical location 104(1) is not obstructed in the region of interest representation 132(1), the shelf management device 110 may proceed to block 520. If the formatting module 118 determines that the physical location 104(1) is obstructed in the region of interest representation 132(1), the shelf management device 110 may proceed to block 522. At block 522, the formatting module 118 may collect a plurality of the region of interest representations 132 corresponding to the physical location 104(1), determine unobstructed portions (i.e., fragments) of the physical location 104(1) within the plurality of region of interest representations, and generate a composite representation 134 with an unobstructed view of the physical location 104(1) based on combining the fragments.

At block 520, the enhancement module 120 may perform one or more enhancement processes on a region of interest representation 132(1) or a composite representation 134(1) to determine enhanced representations 136(1). For example, the enhancement module 120 may perform GIC on the region of interest representation 132(1) to form a first corrected interest representation, perform DOG filtering on the first corrected interest representation to generate a second corrected interest representation, and perform histogram equalization on the second corrected interest representation to generate an enhanced representation 136(1).

At block 524, the edge detection module 122 may determine edge information 138(1) defining the edges around the items 106(1)-(4) as represented within the enhanced representation 136(1). At block 526, the space estimation module 124 may be configured to determine the available space in the physical locations 104(1)-(N) based on the edge information 138(1)-(N) and the reference information 130.

Figure 6:
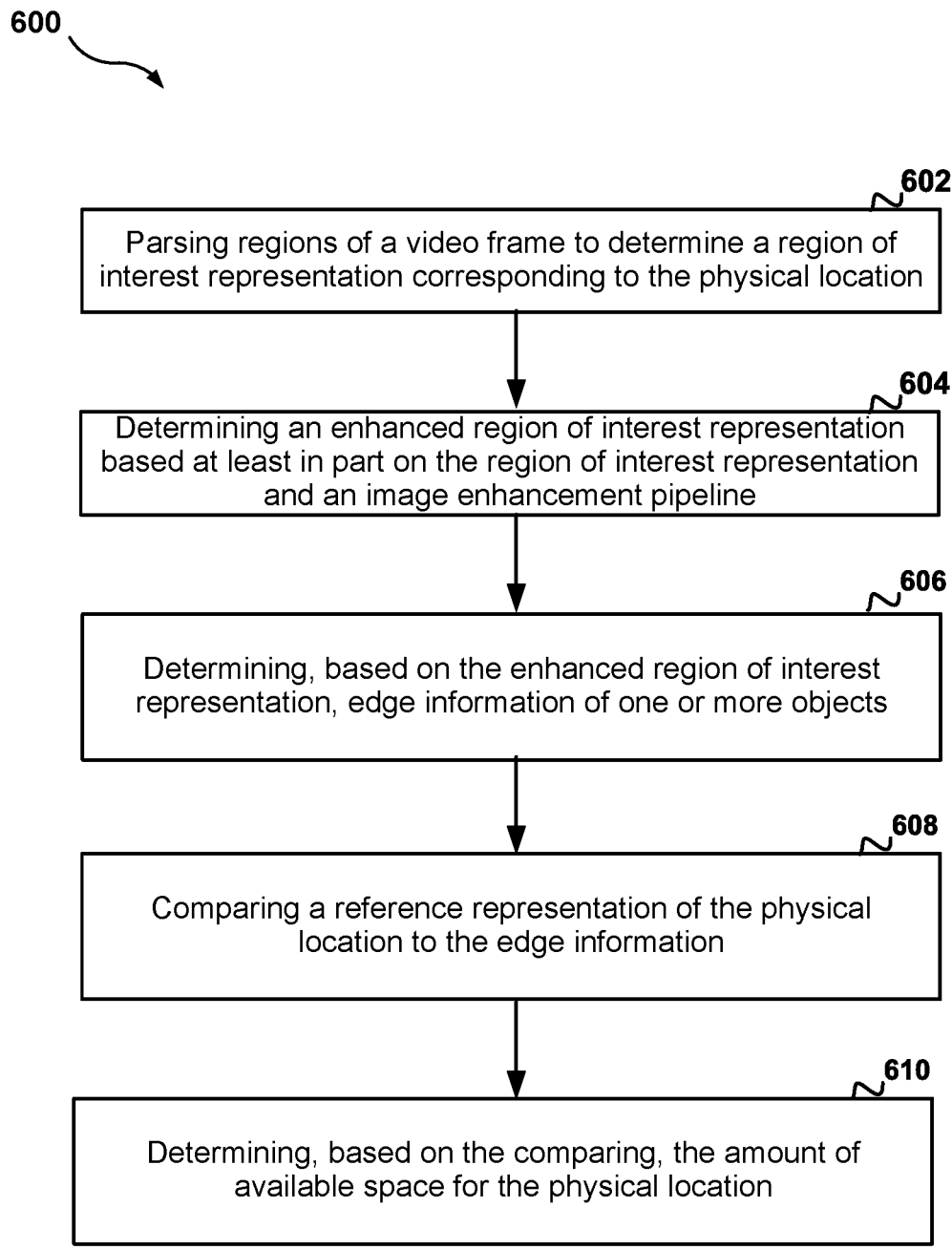
FIG. 6 is a flowchart of a method of implementing real-time tracking of shelf activity with support for dynamic shelf size, configuration, and item containment, according to some implementations.

Referring to FIG. 6, in operation, the shelf management device 110 or computing device 700 may perform an example method 600 for implementing a system for accurately identifying, tracking, and collecting data on a person of interest. The method 600 may be performed by one or more components of the shelf management device 110, the computing device 700, or any device/component described herein according to the techniques described with reference to FIG. 1.

At block 602, the method 600 includes parsing regions of a video frame to determine a region of interest representation corresponding to the physical location. For example, the parser module 116 may be configured to receive the video feed from the video capture device 108, determine a video frame from the video feed, and parse the video frame into a plurality of region of interest representations 132(1)-(N).

At block 604, the method 600 includes determining an enhanced region of interest representation based at least in part on the region of interest representation and an image enhancement pipeline. For example, the enhancement module 120 may be configured to perform one or more enhancement processes (i.e., the image enhancement pipeline) on a region of interest representation 132 or a composite representation 134 to determine the enhanced representations 136(1)-(N).

At block 606, the method 600 includes determining, based on the enhanced region of interest representation, edge information of one or more objects. The edge detection module 122 may be configured to determine the edge information 138(1) defining the edges of the items 106(1)-(N) as represented within enhanced representations 136(1)-(N).

At block 608, the method 600 includes comparing a reference representation of the physical location to the edge information. The space estimation module 124 may compare the reference information 130 of the physical location 104(1) to the edge information 138(1) corresponding to the physical location 104(1).

At block 610, the method 600 includes determining, based on the comparing, the amount of available space for the physical location. For example, the space estimation module 124 may determine the percentage of space available in the physical location 104(1) based upon the difference between the reference information 130 of the physical location 104(1) and the edge information 138(1) corresponding to the physical location 104(1).

Figure 7:
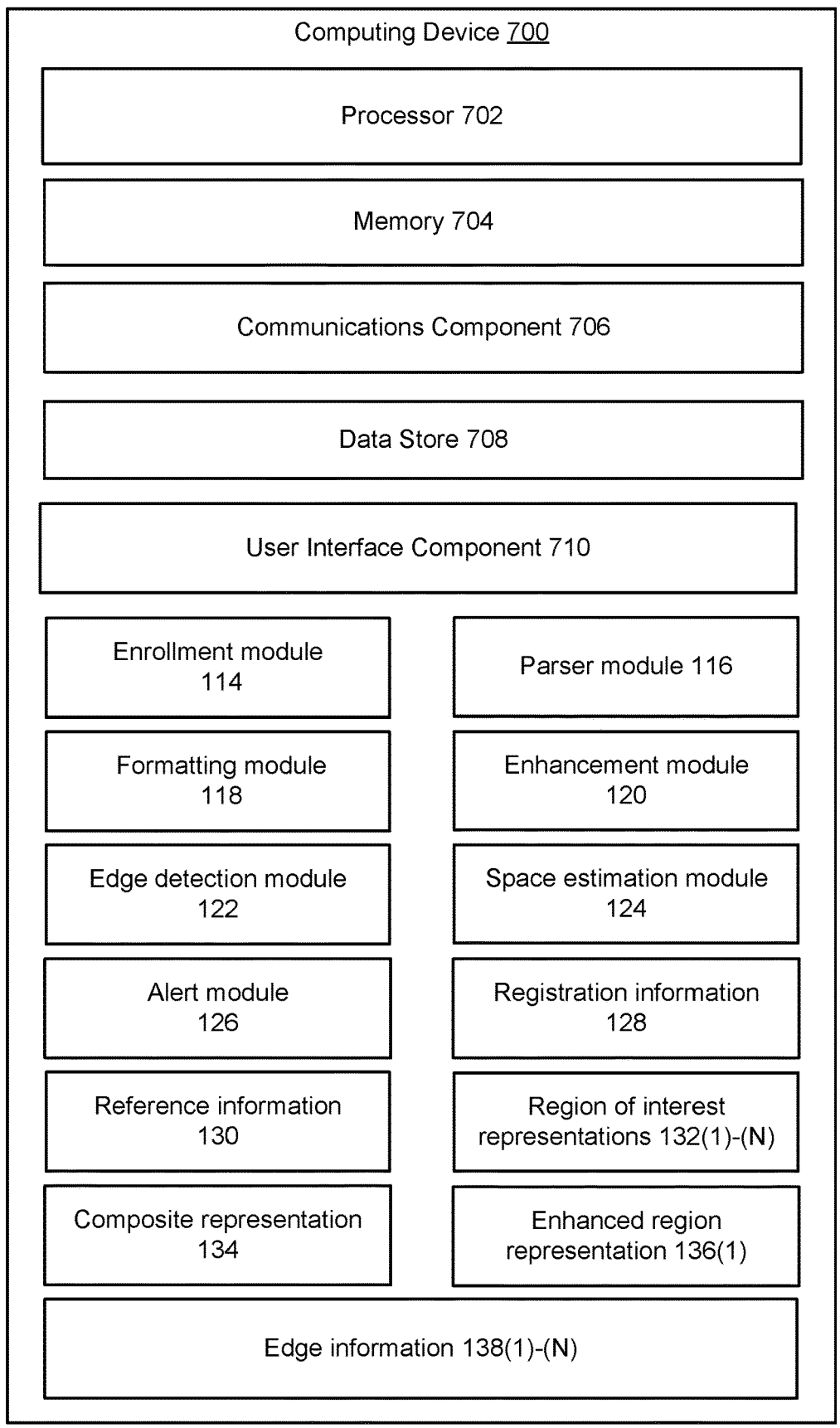
FIG. 7 is block diagram of an example of a computer device configured to implement real-time tracking of shelf activity with support for dynamic shelf size, configuration, and item containment, according to some implementations.

Referring to FIG. 7, a computing device 700 may implement all or a portion of the functionality described herein. The computing device 700 may be or may include or may be configured to implement the functionality of at least a portion of the system 100, or any component therein. For example, the computing device 700 may be or may include or may be configured to implement the functionality of the shelf management device 110, or the customer/associate device 142. The computing device 700 includes a processor 702 which may be configured to execute or implement software, hardware, and/or firmware modules that perform any functionality described herein. For example, the processor 702 may be configured to execute or implement software, hardware, and/or firmware modules that perform any functionality described herein with reference to the enrollment module 114, the parser module 116, the formatting module 118, the enhancement module 120, the edge detection module 122, the space estimation module 124, the alert module 126, or any other component/system/device described herein.

The processor 702 may be a micro-controller, an application-specific integrated circuit (ASIC), a digital signal processor (DSP), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, etc., and/or other components of the computing device 700.

Further, the computing device 700 may include a communications component 706 that provides for establishing and maintaining communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

Further, while the figures illustrate the components and data of the shelf management device 110 as being present in a single location, these components and data may alternatively be distributed across different computing devices and different locations in any manner. Consequently, the functions may be implemented by one or more service computing devices, with the various functionality described herein distributed in various ways across the different computing devices 700. Multiple computing devices 700 may be located together or separately, and organized, for example, as virtual servers, server banks and/or server farms. The described functionality may be provided by the servers of a single entity or enterprise, or may be provided by the servers and/or services of multiple different buyers or enterprises.

What is claimed is:

1. A method for real-time tracking of an amount of available space of a physical location, the method comprising:
    parsing regions of a video frame to determine a region of interest representation corresponding to the physical location;
    determining an enhanced region of interest representation based at least in part on the region of interest representation and an image enhancement pipeline;
    determining, based on the enhanced region of interest representation, edge information of one or more objects;
    comparing a reference representation of the physical location to the edge information; and
    determining, based on the comparing, the amount of available space of the physical location.

2. The method of claim 1, further comprising:
    determining a number of items stored in the physical location based on the amount of available space; and
    displaying the number of items within a graphical user interface.

3. The method of claim 1, further comprising:
    determining a change in a number of items stored in the physical location based on the amount of available space; and
    generating an alert notification based on the change and an attribute of at least one of the items.

4. The method of claim 1, further comprising:
    determining a number of items stored in the physical location based on the amount of available space;
    determining the number of items is below a threshold; and
    generating an alert notification based on the number of items being below the threshold.

5. The method of claim 1, wherein determining the enhanced region of interest representation comprises at least one of:
    applying a light correction method to the region of interest representation;
    applying a shadow effect filter to the region of interest representation; or
    applying a histogram equalization to the region of interest representation.

6. The method of claim 1, further comprising determining that the region of interest representation is of a rectangular shape, and wherein determining the enhanced region of interest representation comprises determining the enhanced region of interest in response to determining that the region of interest representation is of the rectangular shape.

7. The method of claim 1, further comprising:
    determining that the region of interest representation is not of a rectangular shape; and
    applying one or more transformations to the region of interest representation.

8. The method of claim 1, further comprising determining that the physical location is unobstructed in the region of interest representation, and wherein applying the image enhancement pipeline comprises determining the enhanced region of interest in response to determining that the physical location is unobstructed.

9. The method of claim 1, wherein the video frame is a first video frame, and the region of interest representation is a first region of interest representation, and further comprising:
    determining that the physical location is obstructed in the region of interest representation;
    parsing a second video frame to determine a second region of interest representation;
    determining a fragment from the second region of interest representation, the fragment including an unobstructed portion of the physical location;
    generating a composite representation based on the fragment and the first region of interest representation; and
    determining that the physical location is unobstructed in the composite representation,
    wherein determining the enhanced region of interest comprises applying the image enhancement pipeline to the composite representation.

10. The method of claim 1, wherein the edge information is current edge information further comprising:
    determining enrollment information associated with the physical location, the enrollment information including at least one of definition of a region of interest, total capacity information, a storage orientation, or a current number of items in the physical location; and
    determining the reference representation based on the enrollment information.

11. A system comprising:
    a video capture device configured to capture a video frame of a physical location;
    a shelf monitoring device comprising:
        a memory; and
        at least one processor coupled to the memory and configured to:
            receive the video frame from the video capture device;
            parse regions of a video frame to determine a region of interest representation corresponding to the physical location;

determine an enhanced region of interest representation based at least in part on the region of interest representation and an image enhancement pipeline;

determine, based on the enhanced region of interest representation, edge information of one or more objects;

determine difference information based on comparing a reference representation of the physical location to the edge information; and determine, based on the difference information, an amount of available space for the physical location.

12. The system of claim 11, wherein at least one processor is configured to:

determine a number of items stored in the physical location based on the amount of available space; and display the number of items within a graphical user interface.

13. The system of claim 11, wherein at least one processor is configured to:

determine that the region of interest representation is not of a rectangular shape; and apply one or more transformations to the region of interest representation.

14. The system of claim 11, wherein determining the enhanced region of interest representation comprises at least one of:

apply a light correction method to the region of interest representation;

apply a shadow effect filter to the region of interest representation; or apply a histogram equalization to the region of interest representation.

15. The system of claim 11, wherein at least one processor is configured to:

determine that the physical location is unobstructed in the region of interest representation, and wherein applying the image enhancement pipeline comprises determining the enhanced region of interest in response to determining that the physical location is unobstructed.

16. A non-transitory computer-readable device having instructions thereon that, when executed by at least one computing device, causes the at least one computing device to perform operations comprising:

parsing regions of a video frame to determine a region of interest representation corresponding to a physical location;

determining an enhanced region of interest representation based at least in part on the region of interest representation and an image enhancement pipeline;

determining, based on the enhanced region of interest representation, edge information of one or more objects;

comparing a reference representation of the physical location to the edge information; and determining, based on the comparing, an amount of available space for the physical location.

17. The non-transitory computer-readable device of claim 16, the operations further comprising:

determining a number of items stored in the physical location based on the amount of available space; and displaying the number of items within a graphical user interface.

18. The non-transitory computer-readable device of claim 16, wherein determining the enhanced region of interest representation comprises at least one of:

applying a light correction method to the region of interest representation;

applying a shadow effect filter to the region of interest representation; or applying a histogram equalization to the region of interest representation.

19. The non-transitory computer-readable device of claim 16, wherein the video frame is a first video frame, and the region of interest representation is a first region of interest representation, and further comprising:

determining that the physical location is obstructed in the region of interest representation;

parsing a second video frame to determine a second region of interest representation;

determining a fragment from the second region of interest representation, the fragment including an unobstructed portion of the physical location;

generating a composite representation based on the fragment and the first region of interest representation; and determining that the physical location is unobstructed in the composite representation, determining the enhanced region of interest comprises applying the image enhancement pipeline to the composite representation.

20. The non-transitory computer-readable device of claim 16, the operations further comprising:

determining enrollment information associated with the physical location, the enrollment information including at least one of initial edge information, total capacity information, a storage orientation, or a current number of items in the physical location; and determining the reference representation based on the enrollment information.

\* \* \* \* \*